United States Patent [19]

Thomas

[11] 4,281,746

[45] Aug. 4, 1981

[54] INCHING DEVICE

[75] Inventor: Wallace N. Thomas, Bay Village, Ohio

[73] Assignee: Pickands Mather & Co., Cleveland, Ohio

[21] Appl. No.: 28,069

[22] Filed: Apr. 9, 1979

[51] Int. Cl.$^3$ .............................................. B60K 67/00

[52] U.S. Cl. .................................................... 192/3 R

[58] Field of Search .................. 192/1, 3 R, 3 H, 4 R, 192/2, 4 A; 248/675; 74/822

[56] References Cited

U.S. PATENT DOCUMENTS

| | | | |
|---|---|---|---|
| 2,905,289 | 9/1959 | Lee et al. | 192/2 |
| 3,257,104 | 6/1966 | Marland | 192/4 R |
| 3,757,912 | 9/1973 | Ball et al. | 192/2 |
| 3,892,300 | 7/1975 | Hapeman et al. | 192/2 |

*Primary Examiner*—George H. Krizmanich
*Attorney, Agent, or Firm*—Fay & Sharpe

[57] ABSTRACT

An inching device for a grinding mill which allows selective rotation of the mill at reduced speed for mill alignment, maintenance and the like. The device is comprised of a hydraulic motor having an output drive shaft and a disc type brake assembly operably associated with the output shaft. The entire inching device is mountable to the end of a shaft included in the mill drive train. Preferably, this mounting is at an overhanging end area of a high speed shaft included in a drive train speed reducer and is effected by a coupler structure which accommodates selective inching device installation and removal. This coupler structure also comprises the sole support for the inching device. Torque arms fixedly secured to the hydraulic motor and brake assembly extend radially outward of the output shaft generally parallel and coextensive with each other to be affixed by a common retaining member to some rigid structure adjacent the mill. The disc type brake assembly includes a pair of oppositely disposed caliper assemblies which may be selectively spring biased to a braking condition and selectively hydraulically moved to a non-braking condition. Operation of the brake assembly is arranged so that it is only movable from the braking to the non-braking condition when hydraulic fluid charge pressure is simultaneously supplied to the hydraulic motor. Moreover, the brake assembly will be automatically moved to a braking condition upon loss of hydraulic fluid charge pressure in the system.

16 Claims, 7 Drawing Figures

INCHING DEVICE

BACKGROUND OF THE INVENTION

This invention pertains to the art of machinery drive mechanisms and more particularly to so-called inching devices for such machinery.

The invention is particularly applicable to a hydraulic inching device for grinding mills utilized in the ore mining and processing environments and will be described with particular reference thereto. However, it will be appreciated by those skilled in the art that the invention has broader applications and may be used in conjunction with other types of machinery for obtaining incremental or inching movement thereof.

So-called inching movement for machinery, in particular, an ore grinding mill for which the subject invention is particularly designed, is desired for installation and periodic maintenance purposes. The inching device simply allows the machinery or mill to be selectively incrementally moved through its normal operative cycle at a much slower rate of speed than is effected by the main or primary drive means. With regard to grinding mills or the like, the capability for inching the mill is particularly desired for purposes of assuring proper gear, shaft and bearing alignment when a mill is first being installed and for work in relining the mill at such time that the liners become worn and are no longer effective.

Manufacturers of various types of ore grinding mills and auxiliary equipment such as gearing may provide some type of inching arrangement with the mills themselves. These inching devices range from the very simple, purely mechanical devices to more exotic or sophisticated electrically powered devices. The simplest mechanical device utilized merely comprises a cable sling arrangement attached to an overhead crane which allows for selective mill rotation. Such operation is not, however, positive or precise and further requires continuous use of a crane so that it is not available for other work activities. It is also dangerous to personnel who may be installing or relining the mill, as slings have a known tendency to break. The more sophisticated electrical devices are costly. Because of the size of a typical ore grinding mill, these inching devices must also, in turn, be of sufficient size to properly drive the mill during an inching operation. This size adds substantial costs to the mill installation. Moreover, and since an inching device is used periodically as noted above, the necessity for having a separate inching device for each mill is not deemed to be cost effective.

The present invention contemplates new and improved apparatus which overcomes all of the above referred to problems and others and provides an inching device particularly suited for heavy machinery such as ore grinding mills and the like which is simple, economical, safe, readily portable from one grinding mill installation to another, does not require any separate or special supporting framework and which is readily dapted to use in a number of machinery environments for inching purposes.

BRIEF DESCRIPTION OF THE INVENTION

In accordance with the present invention, there is provided an inching device for machinery wherein the inching device is adapted to be selectively fixedly secured to the end of a rotatable shaft included in the machinery drive train. The inching device facilitates selective cycling of the machinery at a substantially reduced rate of speed. Overall, the device itself is comprised of a hydraulic motor and brake assembly with the motor including a rotatable output shaft having coupling means adjacent the outermost end thereof for selectively coaxially coupling the motor and brake assembly to the end of the drive train shaft. This interconnection compirses the sole support for the inching device installation. Torque resisting means are operably associated with the inching device for resisting torque generated thereby during operation. This torque resisting means includes connecting means adapted to releasably secure the resisting means to some rigid structure adjacent the inching device.

In accordance with a more limited aspect of the invention, the device is preferably designed for use with grinding mills of the type having a grinding drum journalled for rotation about its longitudinal axis with drive means operably connected to the drum through a drive train assembly for obtaining drum rotation.

In accordance with another aspect of the present invention, the torque resisting means comprises at least one torque arm fixedly secured to the hydraulic motor so as to extend radially outward of the output shaft. The connecting means is located adjacent the radial outermost end of the torque arm and preferably comprises a releasable locking arrangement between the torque arm and a mounting bracket fixedly secured to some separate rigid structure or framework.

In accordance with a further aspect of the present invention, the brake assembly comprises a disc type brake having a circular brake disc disposed coaxially over the motor output shaft and fixedly secured relative thereto for rotation therewith. At least a pair of brake caliper assemblies are disposed diametrically of the brake disc for selective movement between braking and non-braking conditions.

According to a more specific aspect of the brake assembly arrangement, the brake caliper assemblies include means for selective mechanical biasing thereof to the braking condition and means for selective hydraulic urging thereof to the non-braking condition. In addition, the caliper assemblies are controlled in a manner such that they are only movable to the non-braking condition in response to hydraulic fluid charge pressure being supplied to the hydraulic motor. The caliper assemblies are further controlled in a manner whereby they are automatically moved to the braking condition in response to loss of hydraulic fluid charge pressure in the system.

According to more detailed aspect of the present invention, a torque arm assembly is associated with each of the inching device hydraulic motor and brake assembly with these two torque arm assemblies extending radially outward of the motor output shaft generally parallel to and coextensive with each other. The radial outermost ends of the torque arm assemblies are commonly attached by releasable means to some adjacent rigid structure.

The principal object of the present invention is the provision of a new and improved inching device for heavy machinery wherein the inching device is mountable so that the machinery itself comprises the sole support thereof.

Another object of the present invention is the provision of a new and improved inching device which is simple in design and reliable in use.

Still another object of the present invention is the provision of a new and improved inching device which is readily portable between different machinery installations for selective use in conjunction therewith.

Yet another object of the present invention is the provision of a new and improved inching device which facilitates selectively variable inching speeds.

A still further object of the present invention is the provision of a new and improved inching device which is failsafe in operation in that the brake assembly will be automatically moved to a braking condition when there is loss of hydraulic fluid charge pressure in the inching device system.

Still another object of the present invention is the provision of a new and improved inching device which will retain some associated piece of machinery in a desired selected position even though unbalanced machinery loading forces are present.

Still other objects of and advantages for the subject invention will become apparent to those skilled in the art on a reading and understanding of the following specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
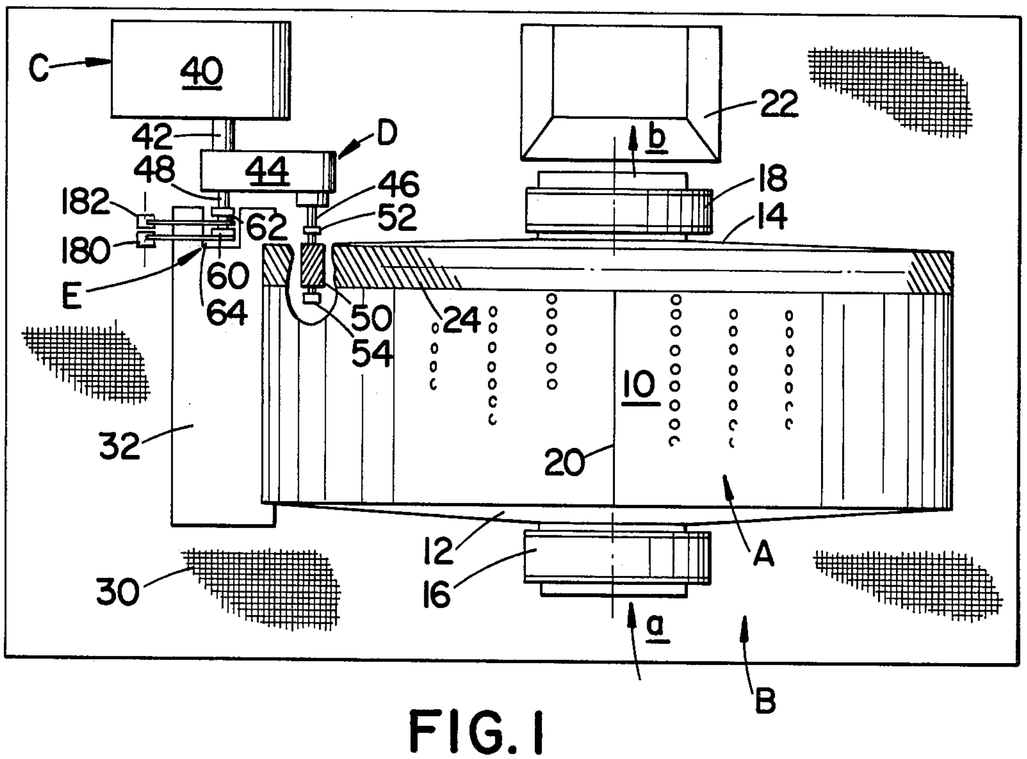
FIG. 1 is a generally schematic plan view of the preferred environment of use and installation for the subject inching device with a small portion thereof cut away for ease of illustration.

Referring now to the drawings wherein the showings are for purposes of illustrating the preferred embodiment of the invention only and not for purposes of limiting same, FIG. 1 generally schematically shows a grinding mill A mounted on a platform-like area B. A drive motor C operably connected to a gearbox or reducer D is utilized to drivingly rotate the mill during normal operation thereof. An inching device E which forms the basis of the subject invention is also operably connected to gearbox or reducer D for selectively driving mill A at a reduced rate of speed. In a grinding mill installation such as that shown in FIG. 1, a pair of drive motors C and gearbox or reducers D are utilized for driving mill A. Since the specifics of this driving arrangement do not in and of themselves form a part of the present invention, such alternatives need not be shown in order for those skilled in the art to appreciate the particular construction and operation of inching device E.

More particularly, and with continued reference to FIG. 1, grinding mill A is comprised of a cylindrical hollow mill body 10 which may have any diameter. The mill body includes a feed end area or face 12 and a dishcarge end area or face 14 with the mill body being horizontally journalled as at journal area 16,18 associated with end areas or faces 12,14, respectively. This arrangement allows the mill body to be rotatably driven about its longitudinal axis 20. In the type of grinding mill shown, the mill is charged with the ore or rock to be ground through an opening (not shown) in feed end face 12 at generally the area of journal 16 as at arrow a. As the ore or rock is ground to the appropriate or desired size, it is discharged from the mill body through an opening (not shown) in end face 14 at generally the area of journal 18 as at arrow b. The ground ore or rock passes to a chute like area generally designated 22 for transport to subsequent processing stations. In the type of grinding mill to which the subject invention is particularly adapted for use, the mill is rotated about longitudinal axis 20 so that the ore is continuously tumbled within the mill body and thereby breaks or pulverizes itself to the necessary size. In addition, water is typically added to the mill so that the ratio between such water and the ore is in the range of 40–60% solids by weight and higher. A bull or girth gear 24 is circumferentially disposed about mill body 10 adjacent end face 14 for purposes of rotatably driving the mill.

Platform-like area B comprises a metal grating-like construction 30 which is somewhat similar to expanded metal. This platform-like area includes suitable openings therein to accommodate a portion of mill body 10, chute 22 and other structures or assemblies associated with the overall mill installation. In addition, the installation includes concrete support pads, rigid steel girders and the like which support the mill equipment and grating 30. One such concrete pad is generally designated 32 in FIG. 1.

The prime mover for mill body 10 comprises a drive motor enclosed in a motor housing 40. The particular grinding mill installation of the type shown in FIG. 1 with which the subject device has been successfully used is normally driven at 10 rpm by a pair of 6000 hp, 900 rpm wound rotor motors. The prime mover enclosed in housing 40 includes a drive shaft 42 operably communicating with a gear reducer structure enclosed within reducer housing 44 and a pair of drive shafts 46,48 extending outwardly of this housing. Output shaft 46 operably communicates with a drive pinion gear 50 which is journalled as at 52,54 in driving communication with bull or girth gear 24. Outwardly extending shaft 48 is essentially an extension of shaft 42 and comprises a so-called high speed input shaft which rotates at a higher speed than shaft 46. The torque required to be applied to input shaft 48 for purposes of turning mill body 10 at 0 to 0.1 rpm, i.e., 0 to 1/100 of its normal operating speed, is approximately 80,000 foot pounds when loaded. This torque requirement will, of course, vary substantially between various mill installations and designs. In FIG. 1, inching device E is shown as operably communicating with high speed input shaft 48 and this inching device will be described in greater detail hereinafter.

The above described grinding mill installation merely comprises one type of exemplary installation to which the concepts of the subject invention may be adapted to use and will allow those skilled in the art to more readily appreciate the general environment of application for the inching device. The device may be used in other environments in conjunction with other types of machinery without departing from the overall intent or scope of the present invention.

Figure 2:
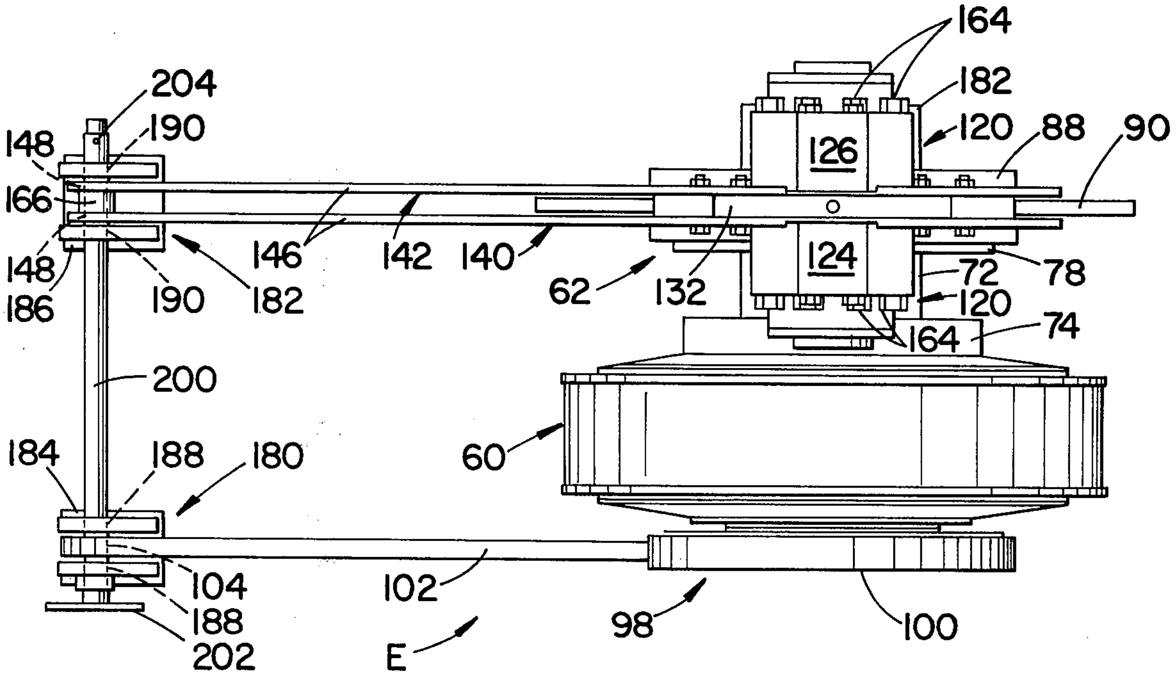
FIG. 2 is an enlarged plan view of the inching device shown in FIG. 1.
Figure 3:
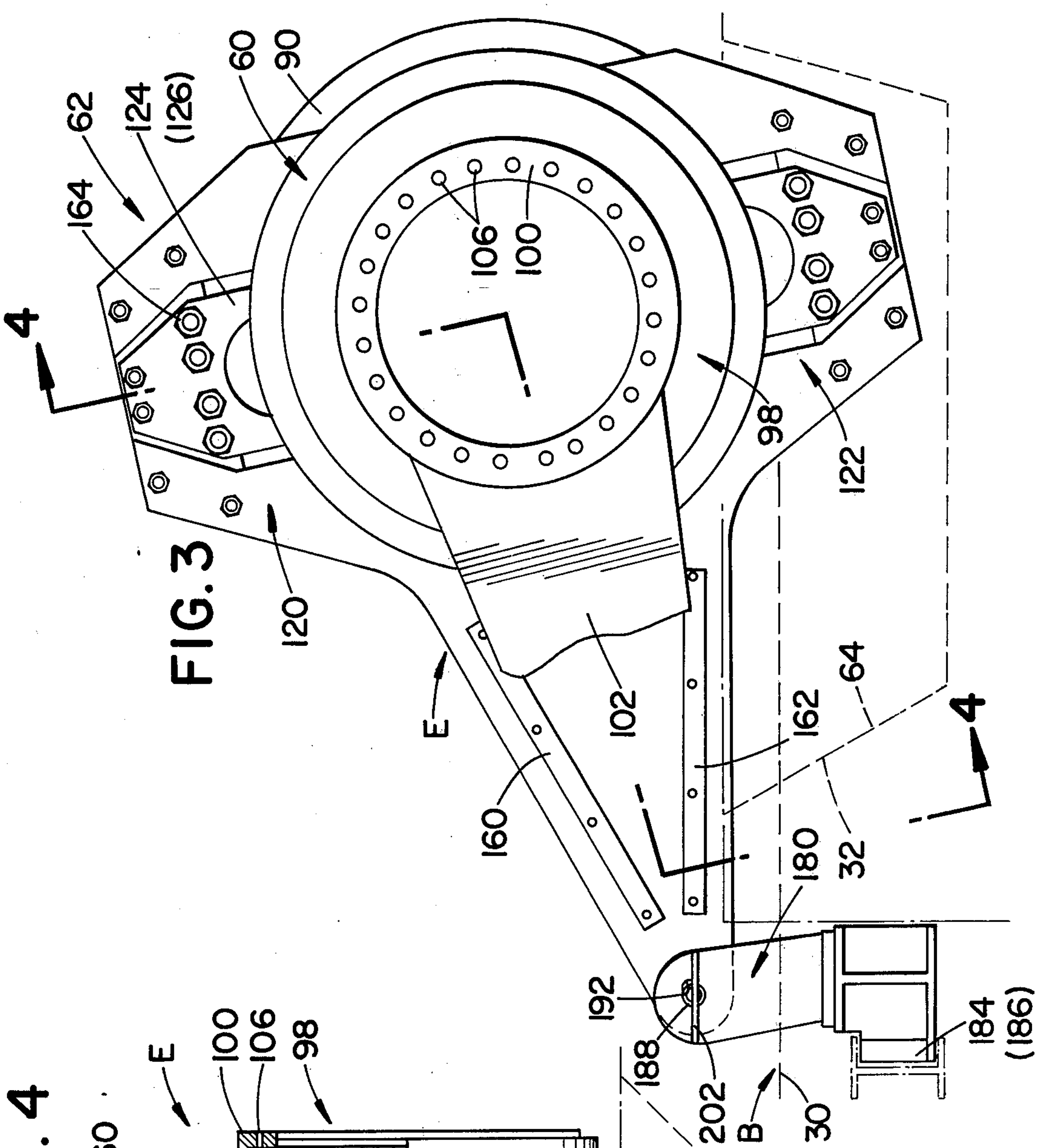
FIG. 3 is a front elevational view of the inching device with a portion thereof in cross-section for ease of illustration.
Figure 4:
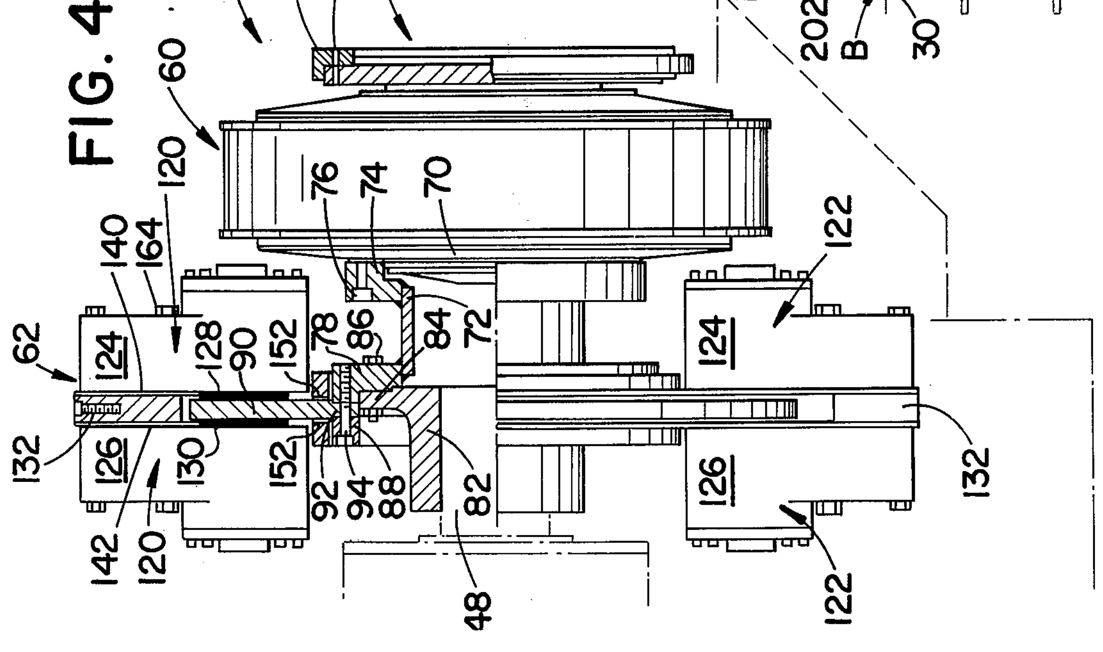
FIG. 4 is a cross-sectional view taken along lines 4—4 of FIG. 3.

With particular reference to FIGS. 2, 3 and 4, inching device E is comprised of a hydraulic motor generally designated 60 and a disc brake assembly generally designated 62. Because of the configuration of the hydraulic motor and disc brake assembly when mounted in an operative relationship relative to shaft 48, a pit-like area 64 (FIGS. 1 and 3) is conveniently provided in concrete support pad 32 for clearance purposes. Hydraulic motor 60 is of a known type and, in the preferred embodiment, comprises a unit manufactured and marketed by AB Hägglund & Söner of Örnsköldsvik, Sweden, under its product designation 8385 which develops 92,500 ft.-lbs. of starting torque. However, other types of hydraulic motors may be advantageously employed to accommodate a particular mill or machinery installation without in any way departing from the overall intent or scope of the present invention. In the FIGURES, the appropriate hydraulic fluid supply is supplied to the motor by conventional hydraulic fluid lines from a hydraulic pump and motor and which are not shown since they do not themselves form a part of the present invention. Likewise, disc brake assembly 62 is, in the preferred embodiment, one which is also manufactured by AB Hägglund & Söner under its designation BSFG 408. Here too, however, the specifics of the brake assembly may be varied to accommodate particular inching device applications. The brake assembly is mechanically biased to a braking condition and hydraulically actuated to a non-braking condition. The requisite hydraulic fluid lines for the brake assembly are also not shown since they do not form a specific part of the present invention.

Hydraulic motor 60 includes an output shaft 70 disposed at the inner face of the motor housing. While this shaft has more the appearance of a drive wheel, it nevertheless acts as an output shaft for the motor and is referred to as such hereinafter. A hollow, cylindrical adapter body 72 which has a circular adapter flange 74 rigidly affixed thereto at one end is connected to output shaft 70 at the adapter flange by mechanical fastening means generally designated 76 so as to extend coaxial with the output shaft. A circular mounting disc or ring 78 is fixedly secured to the other end of adapter body 72 to be selectively placed in cooperative communication with a coupling hub which, itself, is associated with high speed input shaft 48 of gear reducer structure disposed in housing 44 (FIGS. 1 and 4).

More particularly, the coupling hub includes a cylindrical hub body 82 which is conventionally keyed to shaft 48 for selective driving rotation thereof. This hub body includes a circular hub flange 84 which may be selectively affixed to mounting disc or ring 78 by a plurality of threaded fastening means spaced therearound and generally designated 86. The specifics of this mechanical interconnection will be described in some greater detail hereinafter. However, it should be here noted that the inching device is fully supported by the mechanical interconnection between disc or ring 78 and hub flange 84 and does not require additional supportive framework therefor. A circular retaining collar 88 is disposed on the other side of a circular brake disc 90 from mounting disc or ring 78 with a circular brake disc mounting area 92 interposed between disc or ring 78 and collar 88. The mounting disc or ring, brake disc mounting area and collar are fixedly secured to each other by a plurality of threaded fastener means 94 disposed at spaced intervals therearound.

During operation of hydraulic motor 60 which imparts driving rotation to output shaft 70, the interconnection between the output shaft, adapter body 72, adapter flange 74, mounting disc or ring 78, hub body 82, hub flange 84, collar 88 and brake disc 90 is such that they too will rotate coaxially with the output shaft. Since hub body 82 is keyed to gear reducer high speed input shaft 48, shaft 48 will also be rotated. Rotation of shaft 48, in turn, rotates drive gear 50 through the gears in reducer housing 44 and output shaft 46 to, in turn, effect inching movement of mill body 10 about its longitudinal axis 20 (FIG. 1). Since shaft 48 is essentially an extension of motor drive shaft 42, this shaft will also be rotatably driven.

In order to obtain the aforementioned inching of the mill body, it is necessary to counteract torque generated by the hydraulic motor and brake assembly during operation. To that end, a torque arm assembly generally designated 98 is fixedly secured to the opposite end face of hydraulic motor 60 from output shaft 70. This torque arm assembly includes a mounting collar 100 having an elongated torque arm 102 extending radially of output shaft 70. Disposed at the radial outermost end of the torque arm is an opening 104 to allow convenient mounting thereof as will become more readily apparent hereinafter. The torque arm assembly is affixed to hydraulic motor 60 by a plurality of threaded fastener means 106 (FIG. 3) disposed at spaced intervals around mounting collar 100.

In addition to brake disc 90, disc brake assembly 62 is comprised of a pair of brake caliper assemblies 120,122 diametrically opposed from each other relative to the brake disc (FIGS. 3 and 4). It will be seen in FIG. 4 that these two assemblies are identical to each other with each having a pair of opposed housings 124,126 including caliper arrangements generally designated 128,130 which operate in a manner to be described hereinafter. A spacer member or element 132 is disposed between housings 124,126 of each caliper assembly 120,122 for purposes of retaining the housings and brake caliper arrangements in a desired spaced relationship relative to brake disc 90.

Figure 5:
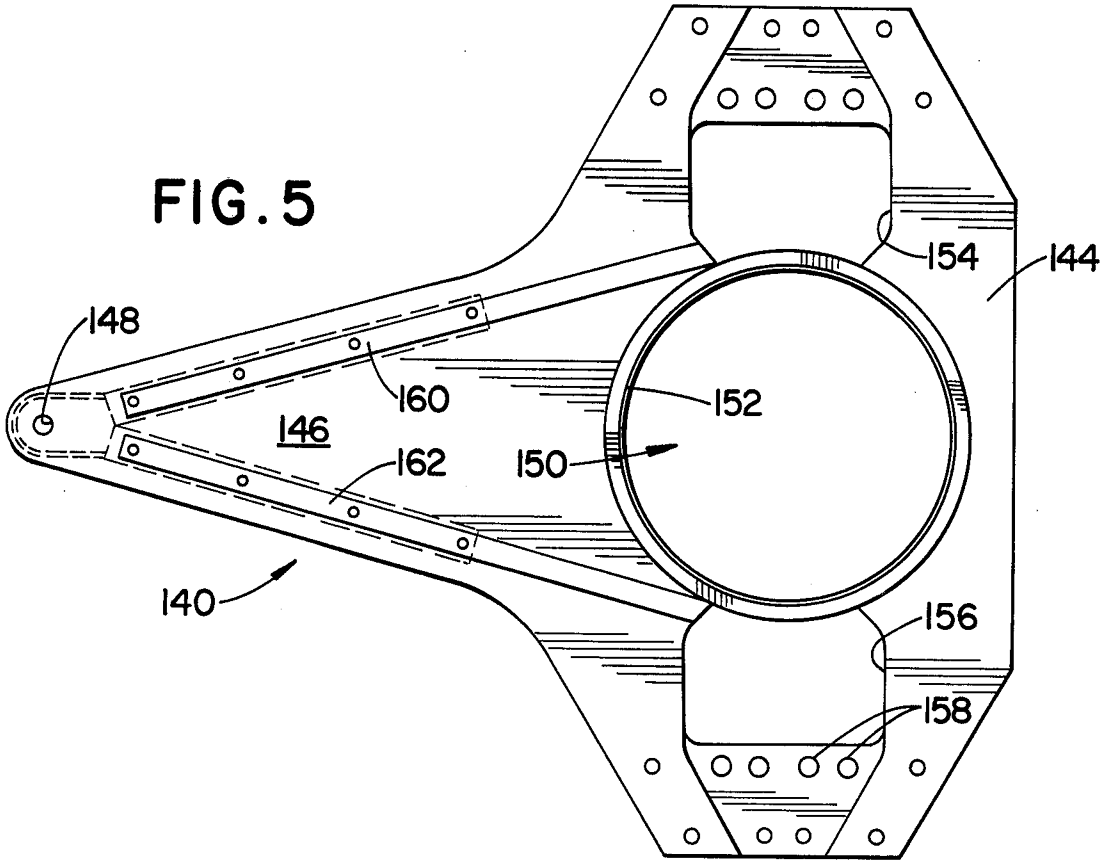
FIG. 5 is a side elevational view of one of the brake assembly torque arms.

As best shown in FIGS. 2 and 4, a pair of combination caliper assembly mounting brackets and brake assembly torque arms 140,142 are advantageously provided for brake assembly 62. These bracket/arms are stationarily disposed relative to the rotating drive shaft of hydraulic motor 60 for stationarily supporting caliper assemblies 120,122 and spacers 132. FIG. 5 shows bracket/arm 140 in side elevation and to which reference will hereinafter be made. It will be appreciated that bracket/arm 142 is substantially identical thereto and of the opposite hand except where may be specifically noted.

Bracket/arm 140 includes a frame portion 144 having an elongated arm 146 extending outwardly thereof. An opening 148 is included adjacent the terminal end of arm 146 for reasons which will become apparent. Frame portion 144 includes a generally central opening 150 having a flange bearing construction 152 extending therearound. The innermost surface of this flange bearing is adapted to be closely received over and ride on the outer peripheral surface of mounting disc or ring 78

(FIG. 4). The frame for bracket/arm 142 includes a similar flange bearing construction received over the outer peripheral surface of collar 88 (FIG. 4). A pair of caliper relief openings 154,156 are diametrically opposed for each other across central opening 150 of frame portion 144 in order to allow the brake calipers to engage brake disc 90. A plurality of openings 158 adjacent openings 154,156 are utilized for purposes of mounting the caliper housings to the frame. A pair of support bars 160,162 extend along arm 146 and converge toward each other from adjacent central opening 150 to adjacent mounting opening 148. These bars may be affixed to arm 146 by convenient means such as threaded fasteners or the like.

With reference to FIG. 2, caliper housings 124,126 are conveniently fixedly secured to bracket/arms 140,142 as by, for example, threaded fastening means 164 communicating with openings 158 (FIG. 5). As will best be noted from FIGS. 2 and 3, bracket/arms 140,142 are disposed on opposite sides of brake disc 90 with the elongated arm portions extending radially of hydraulic motor drive shaft 70. A tubular spacer 166 is fixedly interposed between the arms adjacent the radial outermost ends thereof in alignment with mounting openings 148. As will be seen in FIG. 2, the torque arm arrangements for both hydraulic motor 60 and brake assembly 62 extend radially outward of the motor drive shaft generally parallel and coextensive with each other. During operation of the inching device, the only portion of the brake assembly which rotates in conjunction with hydraulic motor drive shaft 70 is brake disc 90.

For purposes of retaining the hydraulic motor and brake assembly torque arms fixedly positioned to resist torque generated during inching device operation, a pair of spaced apart generally U-shaped receiving and retaining brackets 180,182 best shown in FIGS. 1, 2 and 3 are advantageously employed. These brackets are conveniently rigidly affixed as at areas 184,186, respectively, to some rigid structure such as structural beams or the like adjacent the inching device (FIGS. 2 and 3). As best shown in FIG. 2, receiving brackets 180,182 include aligned through openings 188,190, respectively, along with an elongated release slot 192 (FIG. 3) for allowing selective removal of a retaining shaft.

With continued reference to FIGS. 2 and 3, an elongated retaining shaft 200 may be releasably inserted through the openings in the torque arms and receiving brackets for positively retaining the torque arms in position. This shaft advantageously includes a T-shaped handle 202 at one end and an outwardly extending pin 204 at the other end. The pin is dimensioned so that on proper rotation of the shaft by means of handle 202, it may be aligned with slots 192 (FIG. 3) to allow selective removal of the shaft.

Figure 6:
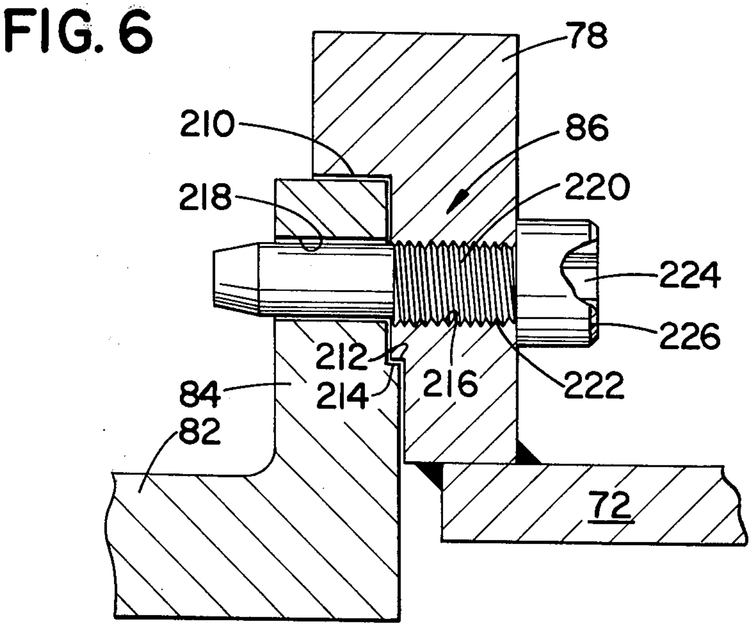
FIG. 6 is an enlarged cross-sectional view showing a preferred mechanical interconnection between the hydraulic motor output shaft and an associated machinery drive train drive shaft; and, FIG. 7 is a schematic illustration of a brake assembly and hydraulic circuit.

FIG. 6 shows in greater detail the preferred releasable interconnection between mounting disc or ring 78 and hub flange 84 of the coupling hub. More particularly, circular mounting disc or ring 78 includes an inwardly extending shoulder or recess area 210 which receives a portion of the outer periphery of hub flange 84 therein. In addition, disc or ring 78 and hub flange 84 include a pair of interfitting shoulder areas 212,214. Both disc 78 and hub flange 84 include a plurality of axially extending openings at spaced interals therearound. The radial spacings of these openings are equal to each other and, in the preferred embodiment here under discussion, each of disc 78 and hub flange 84 include ten (10) openings which are alignable with each other. Alternating ones of the openings in disc 78 are threaded with one of these threaded openings being designated 216 in FIG. 6. The other of the threaded openings are identical thereto unless otherwise specifically noted. Each opening 216 is axially aligned with a through opening 218 in hub flange 84.

For each of threaded openings 216, the mechanical fastening means generally designated 86 comprises a special driving pin 220 which has the innermost portion of the shank threaded as at 222 and the outermost end portion of the shank unthreaded. The driving pin may also advantageously include a wrench socket 224 in head 226 thereof. As will be noted, the driving pin is threadedly received in disc or ring 78 opening 216 and simply extends through the aligned opening 218 of hub flange 84. The relationship between the pin shank and opening 218 is a sliding fit to allow ease of inching device installation and removal for use on a particular grinding mill. The remaining of the plurality of openings spaced around mounting disc or ring 78 comprise unthreaded through openings (not shown in FIG. 6) which are alignable with similar through openings in hub flange 84. These openings receive conventional elongated threaded fasteners or bolts with conventional nuts for purposes of closely fixedly securing disc 78 and hub flange 84 together. Thus, in the preferred arrangement, the interconnection between components 78,84 is comprised of: (1) five (5) driving pins 220 threadedly received by openings 216 in disc 78 and extending into aligned openings 218 of hub flange 84; and, (2) five (5) elongated bolts and nuts which alternate with driving pins 220.

The mechanical interconnection between disc or ring 78 and hub flange 84 comprises the sole support for the inching device in its installed position at a particular grinding mill assembly. The torque arm assemblies do not support the weight of the inching device and only act to resist torque generated during device operation. This feature is significant from the standpoint that it reduces the need for special or permanent framework or support means which would add further cost and weight thereto. As it is, the construction shown in the drawings and hereinabove described in detail may weigh approximately 7000 lbs. or so. The specific number of mechanical fastening means described hereinabove for coupling elements 78,84 together may be varied to accommodate different structural modifications. In addition, coupling arrangements other than the specific one disclosed with reference to FIG. 6 may also be utilized. Such modifications do not depart from the overall intent or scope of the present invention.

In using the subject inching device and with particular reference to FIGS. 1, 2 and 4, energization of hydraulic motor 60 by the associated hydraulic pump and motor will cause rotation of outer shaft 70 which, in turn, will effect rotation of extended gear reducer high speed input shaft 48 through its interconnection therewith. Such driving movement, in turn, causes rotation of pinion gear 50 (FIG. 1) for driving mill body 10 itself. As hereinabove noted, this driving movement is at a substantially reduced rate of speed and, in the preferred embodiment, comprises in the range of from 0 to approximately 1/100 of the speed of the grinding mill which would be normally achieved by the prime mover or drive motor. Since the purpose of inching the mill is to simply allow for alignment or repair, this reduced speed is desired to permit selective rotational mill body adjustment for these purposes. Moreover, use of a hydraulic type motor to drive the inching device advantageously allows the inching speed to be selectively varied between, for example, 0 to approximately 1/100 of the normal mill speed. Once the inching device has moved the mill body to a particular desired position, the hydraulic motor may be stopped and the disc brake assembly moved to its braking condition. Although the hydraulic system can be locked up to prevent subsequent rotation of the mill when it is being held in an unbalanced condition, unavoidable internal leakage for hydraulic motor 60 allows objectionable creep. This creep is prevented by means of brake assembly 62. Movement of the brake caliper assemblies to the braking condition in braking communication with brake disc 90 is, as noted above, under the influence of spring biasing means which comprise a part of the caliper assemblies.

When it is desired to further inch the mill body to yet another position, it is merely necessary to release the caliper assemblies for the braking condition to a non-braking condition and energize hydraulic motor 60. Brake assembly 62 is operably connected with motor 60 so that overall inching device operation is what may be fairly termed as "failsafe". In that regard, the hydraulic release system for the brake assembly is interconnected with the rest of the inching device construction in a manner requiring that the main pump and motor be operating and developing hydraulic fluid charge pressure before the brakes are actually released or moved to the non-braking condition. In addition, the brake assembly hydraulic release system and biasing means are interconnected in the inching device in a manner which causes the brakes to be automatically moved to the braking condition any time there is a loss of hydraulic fluid charge pressure in the system. This feature is desirable so that in the event a hydraulic line ruptures, there is a power failure or there is some other type of hydraulic system failure, the brake assembly will immediately move to the braking condition and prevent further rotation of the mill.

When inching device E is no longer required at a particular grinding mill installation, it is easily removed, transported to another mill installation and reinstalled for use. More particularly, it is merely necessary to remove elongated retaining shaft 200 from its retaining relationship in U-shaped receiving brackets 180,182 with the torque arm 102 of torque arm assembly 98 and arms 146 of bracket arms 140,142. Since the only interconnection between the inching device and the mill itself is between mounting disc or ring 78 and hub flange 84, as generally shown in FIG. 4 and more particularly shown in FIG. 6, it is merely necessary to remove the mechanical fastening means (fasteners 86 in FIG. 4 and conventional bolts used in the preferred arrangement of FIG. 6) from their relationship between the mounting disc and hub flange. Thereafter, the entire inching device E, with its associated hydraulic equipment and controls (not shown), may be lifted by an overhead crane or the like to another mill where it may be reinstalled for inching use. Lifting hooks (not shown) may be included at strategic inching device locations to accommodate such movement. Reinstallation simply comprises reversing the above noted removal steps. This then allows a single inching device to serve a single grinding mill or a plurality of grinding mills in a processing plant.

Figure 7:
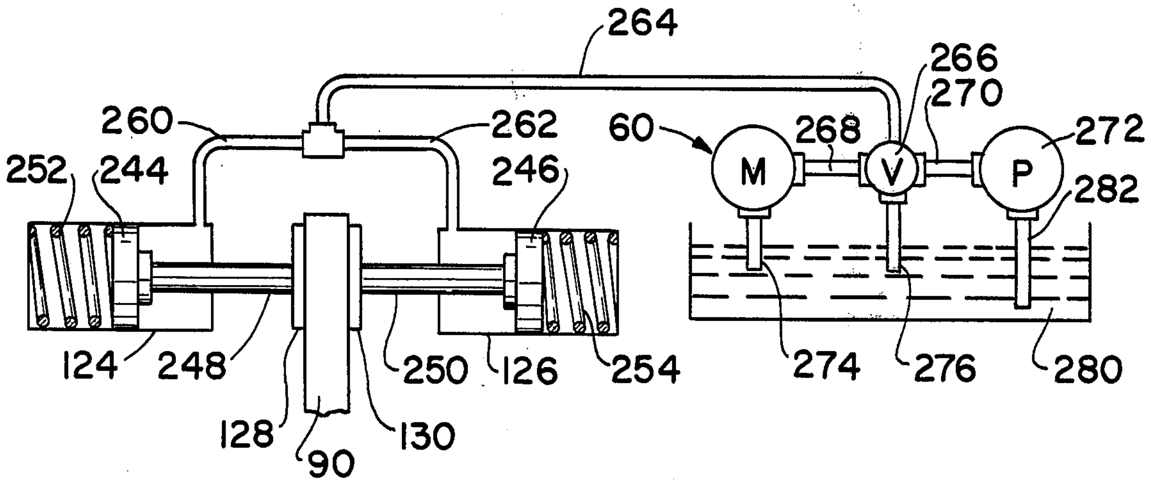

FIG. 7 is a schematic illustration of a brake assembly and hydraulic circuit wherein brake caliper housings 124,126 receive pistons 244,246 having rods 248,250 cooperating with calipers 128,130 for moving same toward or away from brake disc 90. Springs 252,254 normally bias pistons 244,246 toward brake disc 90 for engaging calipers 128,130 therewith to apply the brakes. Conduits 260,262 are connected with housings 124,126 on the opposite sides of pistons 244,246 from springs 252,254. Conduits 260,262 are connected by another conduit 264 to valve 266 which in turn is connected by conduit 268 with hydraulic motor 60 and by conduit 270 with hydraulic pump 272. Return conduits 274,276 respectively connect motor 60 and valve 266 with reservoir 280, and supply conduit 282 connects pump 272 with reservoir 280. When valve 266 is positioned for communication of conduit 270 with conduit 268 to operate motor 60, conduit 270 is also in communication with conduit 264 and return conduit 276 is closed. When valve 266 is positioned for blocking flow to motor 60 through conduit 268, conduits 264 and 270 are individually in communication with return conduit 276. Pressurization of conduits 260,262 moves pistons 244,246 away from brake disc 90 for disengaging the brakes and this takes place only when valve 266 is positioned for supplying hydraulic fluid to motor 60. Springs 252,254 provide means for mechanical biasing of calipers 128,130 to a braking condition. Valve 266 provides means for selective hydraulic urging of calipers 128,130 to a non-braking condition only when fluid pressure is supplied to motor 60. Valve 266 also provides means for selectively moving calipers 128,130 between braking and non-braking positions. Obviously, many other arrangements may be provided for selectively applying or releasing the brakes as this is an inherent feature of virtually all brake mechanisms.

The invention has been described with reference to the preferred embodiment. Obviously, modifications and alterations will occur to others upon the reading and understanding of this specification. It is my intention to include all such modifications and alterations insofar as they come within the scope of the appended claims or the equivalents thereof.

Having thus described my invention, I now claim:

1. A hydraulic inching device for a grinding mill of the type having a grinding drum journalled for rotation about its longitudinal axis and drive means operably connected to said drum through a drive train for obtaining the desired rotation, said inching device comprising:

a hydraulic motor having a rotatably driven output shaft including means for allowing selective coaxial coupling thereof to a shaft in said drive train for selectively rotatably driving said drum in place of said drive means at a reduced rate of speed; a brake assembly operably associated with said hydraulic motor output shaft and which may be selectively placed in braking and non-braking conditions therewith for maintaining said drum in a predetermined rotated position; and, said brake assembly being controlled in a manner such that it may only be moved to said non-braking condition in response to hydraulic fluid charge pressure being supplied to said motor.

2. The inching device as defined in claim 1 including an interconnection between said drive train shaft and said motor output shaft, said hydraulic motor and brake assemblies being supported solely by said drive train shaft at said interconnection.

3. The inching device as defined in claim 2 further including first arm-like means fixedly associated with said hydraulic motor and second arm-like means fixedly associated with said brake assembly for resisting torque generated thereat during operation of said inching device.

4. The inching device as defined in claim 3 wherein said first and second arm-like means comprise first and second torque arms extending radially outward of said motor output shaft and including connecting means adjacent the radial outermost ends thereof to permit torque arm connection to some rigid structure.

5. The inching device as defined in claim 4 wherein said connecting means is adapted to allow releasable connection of said first and second torque arms to said rigid structure by a common retaining shaft.

6. The inching device as defined in claim 1 wherein said brake assembly comprises a disc type brake having a circular brake assembly disposed coaxially over said motor output shaft and fixedly secured for rotation therewith, said brake assembly further including at least a pair of brake caliper assemblies disposed diametrically of said brake disc and selectively movable between said braking and non-braking conditions.

7. The inching device as defined in claim 6 wherein said brake caliper assemblies include means for selective mechanical biasing thereof to said braking condition and means for selective hydraulic urging thereof to said non-braking condition only when hydraulic fluid charge pressure is simultaneously supplied to operate said motor.

8. In a grinding mill having a grinding drum rotatably driven by drive means disposed in operative driving communication with said drum and including a speed reducer structure having a shaft interposed in the driving relationship between said drive means and drum, a hydraulic inching device comprising:

a hydraulic motor having a rotatably driven output shaft adapted to be selectively coupled to an end of said speed reducer shaft whereby said hydraulic motor may be selectively used to rotate said drum at a reduced rate of speed; a disc type brake assembly operably associated with the output shaft of said hydraulic motor including a brake disc rotatable with said output shaft and at least a pair of caliper assemblies diametrically disposed from each other relative to said brake disc, said caliper assemblies being selectively movable between braking and non-braking conditions for retaining said drum in a predetermined rotated position and for allowing further rotation thereof; coupling means associated with the outermost end of said motor output shaft for drivingly interconnecting said output shaft to an end of said speed reducer shaft, said coupled interconnection between said output shaft and speed reducer shaft comprising the sole support for said inching device; and, torque resisting means extending radially outward of said motor output shaft for resisting torque generated by said inching device during operation thereof and including connecting means for releasably connecting said resisting means to some rigid structure.

9. The inching device as defined in claim 8 wherein said torque resisting means comprises a first torque arm fixedly associated with said hydraulic motor and a second torque arm fixedly associated with a portion of said disc type brake assembly, said first and second torque arms extending radially outward of said motor output shaft substantially parallel to and coextensive with each other.

10. The inching device as defined in claim 9 wherein said first and second torque arms include aligned connecting means adjacent the radial outermost ends thereof for allowing said torque arms to be releasably secured to some rigid structure adjacent said inching device by a common retaining member.

11. The inching device as defined in claim 8 wherein said brake assembly includes mechanical biasing means for selectively uring said caliper assemblies to said braking condition and hydraulic force means for selectively urging said caliper assemblies to said non-braking condition, said caliper assemblies only being movable to said non-braking condition in response to hydraulic fluid charge pressure being supplied to said hydraulic motor.

12. A portable inching device for machinery and the like wherein said inching device is adapted to be selectively fixedly secured to the end of a rotatable shaft included in the machinery drive train in order to selectively operate said machinery at a reduced rate of speed, said inching device comprising:

a hydraulic motor and a brake assembly with said motor having a rotatable output shaft including coupling means adjacent the outermost terminal end thereof for selectively coaxially coupling said motor output shaft to said drive train shaft, the coupled interconnection between said output shaft and said drive train shaft comprising the sole support for said inching device; and, torque resisting means operably associated with said inching device for resisting torque generated during operation thereof, said torque resisting means including connecting means for releasably connecting said resisting means to some separate rigid structure apart from said inching device.

13. The inching device as defined in claim 12 wherein said torque resisting means comprises at least one torque arm fixedly secured to said inching device so as to extend radially outward of said output shaft, said connecting means being disposed adjacent the radial outermost end of said torque arm.

14. The inching device as defined in claim 12 wherein said brake assembly comprises a disc type brake having one of a brake disc and at least one caliper selectively rotatable with said motor output shaft relative to the other, said at least one caliper assembly being selectively movable to a braking condition by mechanical biasing means for preventing rotation of said output shaft and to a non-braking condition by hydraulic means to allow rotation of said output shaft.

15. The inching device as defined in claim 14 wherein said at least one caliper assembly is only movable to said non-braking condition in response to hydraulic fluid charge pressure being supplied to said motor.

16. The inching device as defined in claim 14 wherein said at least one caliper assembly is automatically movable from said non-braking condition to said braking condition in response to loss of hydraulic fluid charge pressure to said inching device.

* * * * *